INVENTOR
GEORGE A. KOCHANOWSKI

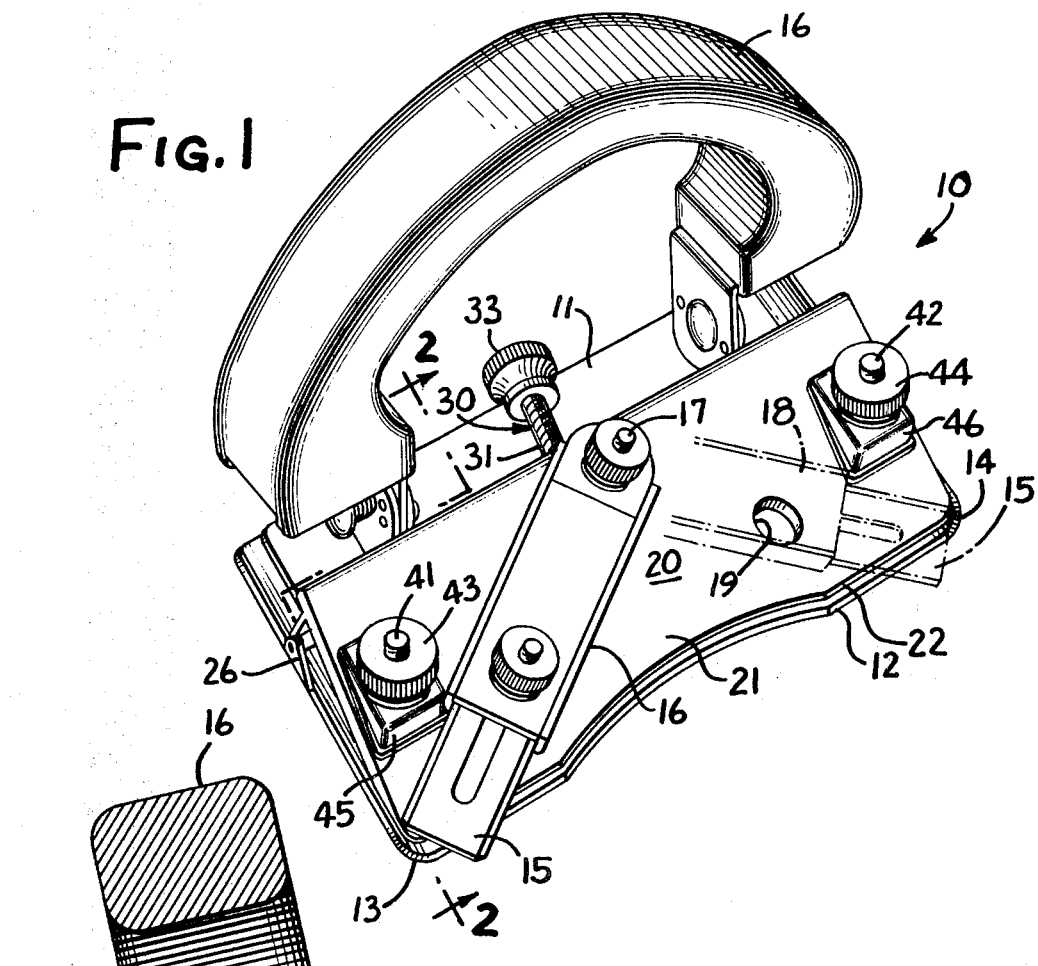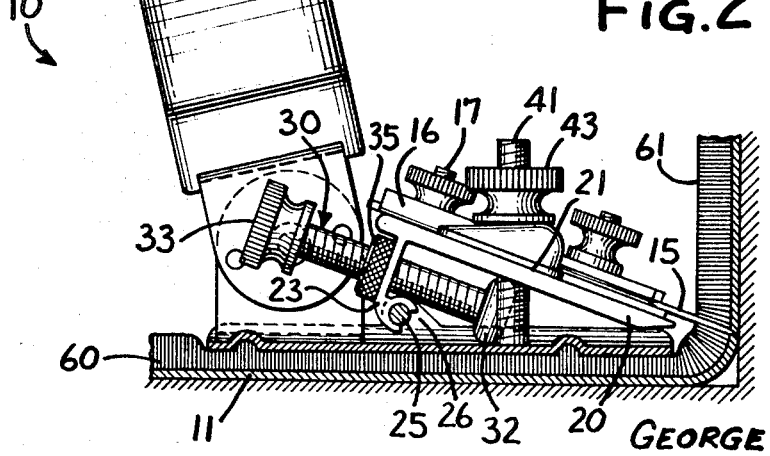

//!

United States Patent Office 3,581,397
Patented June 1, 1971

1

3,581,397
TRIMMER FOR FOAM-BACKED CARPETING OR THE LIKE
George A. Kochanowski, Chicago, Ill., assignor to Kinkead Industries Incorporated, Chicago, Ill.
Filed May 16, 1969, Ser. No. 825,246
Int. Cl. B26b 29/00
U.S. Cl. 30—293
7 Claims

ABSTRACT OF THE DISCLOSURE

A carpet trimmer especially intended for foam-backed carpeting which includes a plate for riding along the bent-up edge of the carpet at the wall position with a blade mounted thereon for trimming off the excess or scrap so that the trimmed edge abuts the wall. Means are provided for positively blocking the blade holder in adjusted position for proper height of cut.

---

In the laying of carpeting wall to wall it is necessary to trim off the excess to provide a precise fit. In the case of foam-backed carpeting in which a foam pad is permanently secured to the underside of the carpet, conventional carpet trimmers have proven to be ineffective and special designs of trimmers utilizing a projecting angled blade have been employed.

It is an object of the present invention to provide a trimmer intended for use with foam-backed carpeting in which the blade may be easily and quickly positioned at an accurately determined cutting height and in which means are provided for insuring that the blade holder is positively blocked against movement upwardly or downwardly from its adjusted position. Thus the trimmer is to be contrasted with prior designs of trimmers which rely upon biasing springs for blade positioning purposes and which are subject to blade deviation and the making of an inaccurate cut under certain conditions which may be encountered in the field.

It is yet another object of the invention to provide a carpet trimmer for foam-backed carpeting having the above feature and which utilizes much of the structure of earlier trimmer designs so that the benefits of the invention may be achieved with relatively simple and inexpensive modification.

Other objects and advantages of the invention will become apparent upon reading the attached detailed description and upon reference to the drawings in which:

FIG. 1 is a perspective view of a carpet trimmer constructed in accordance with the present invention;

FIG. 2 is an end elevation of the trimmer of FIG. 1 in partial section in the act of trimming of foam-backed carpeting of typical thickness looking along the line 2—2 in FIG. 1;

Figure 3:
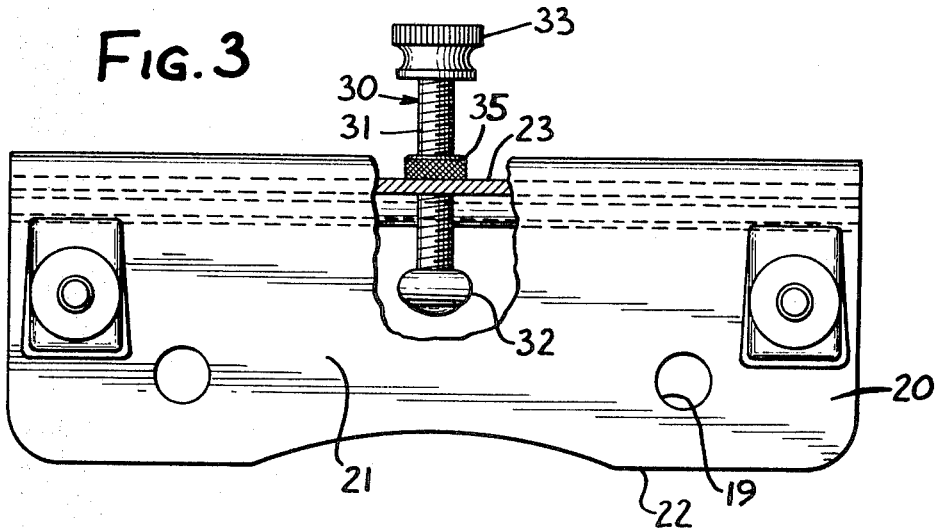
FIG. 3 is a top view of the blade supporting plate with a portion broken away to show the height adjusting member.

While the invention has been described in connection with a preferred embodiment, it will be understood that I do not intend to be limited to the particular embodiment shown but intend on the contrary to cover the various alternative and equivalent constructions included within the spirit and scope of the invention.

Turing now to the drawings, FIG. 1 shows a carpet trimmer 10 having a base plate 11 in the form of a flat plate of metal, the ends of which are slightly upturned for riding along the surface of the carpet. The base plate has a working edge 12 terminating in corners 13, 14, with a blade 15 extending beyond the working edge in one of the corner positions. The blade 15 is mounted in a blade holder 16 which is pivoted to a supporting plate 20 on a pivot 17 about which the blade holder is swingable between a first cutting position shown in the full lines and a second cutting position shown by the dot-dash outline 18, the position being selected in accordance with the desired direction of cut. The blade holder is held in the selected position by engagement of alternate detent openings of which the opening 19 is visible in FIG. 1.

In carrying out the invention, the supporting plate 20 is of L-shaped cross section having a sloping portion 21 with a working edge 22 and a mounting portion, or web, 23 along its rear edge extending downwardly toward the base plate. For the purpose of hinging the support plate to the base plate, the mounting portion has a longitudinally extending opening for accommodating a hinge pin 25, the ends of the pin being received in hinge brackets 26 in the form of small bent-up tabs at the opposite ends of the base plate. The supporting plate may be conveniently formed in L cross section as an extrusion of aluminum or the like.

Figure 4:
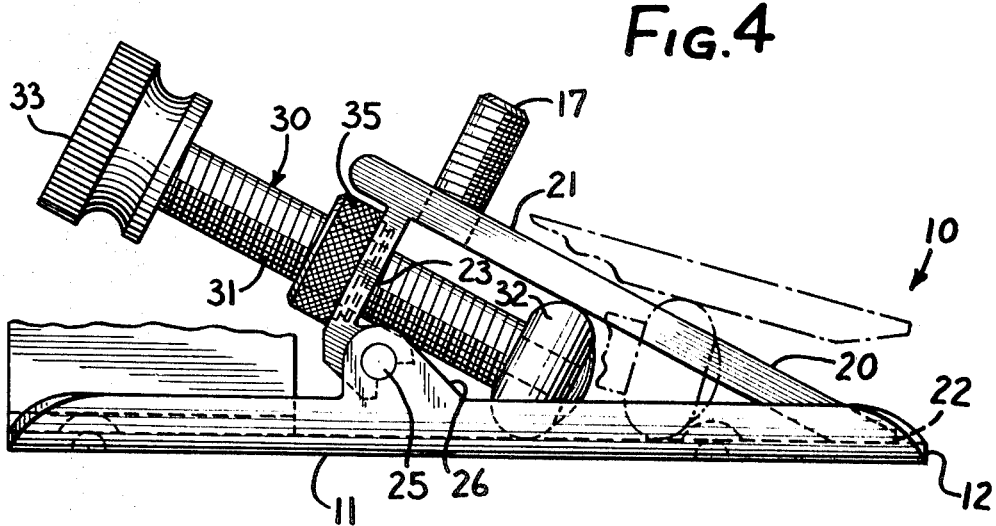
FIG. 4 is an enlarged end elevation, somewhat simplified, showing the extremes of adjustment which may be achieved.

In accordance with the present invention, a positive stop is provided which is adjustably interposable between the blade supporting plate and the base plate for the purpose of accurately defining the effective height of the supporting plate and consequently the cutting height of the blade. More specifically in accordance with the invention, an adjusting screw is provided which threadedly penetrates the vertical mounting portion or web 23 of the supporting plate and which has a tip which acts as a bottoming stop or spacer between the supporting and base plate and with means for maintaining the supporting plate pressed against the stop to prevent movement in either direction from adjusted position. Thus referring to the drawings, I provide an adjusting screw 30 having a threaded shank 31, a tip 32 at its inner end and a knob 33 at the outer end. The shank is engaged with a stationary nut 35 which is captively mounted at the center of the web 23. The tip 32 of the adjusting screw is preferably in the form of an enlarged, smoothly rounded ring or bushing providing smooth engagement along a line of contact on both of the engaged plates. The adjusting screw is preferably located at the middle of the supporting plate so that only a single adjusting screw is required for adjustment of the blade at both of its selectable corner positions. Moreover, the screw is mounted so as to be perpendicular to the web portion 23 so that the tip 32 remains in contact with the underside of the supporting plate, moving parallel thereto throughout the range of adjustment shown in FIG. 4 and so that the knob projects upwardly as well as outwardly for easy access.

For the purpose of clamping the supporting plate against the stop after the screw has been turned to a desired position, clamping screws 41, 42 are provided at the respective ends of the supporting plate. Such clamping screws are butt welded or otherwise secured to the base plate and extend through suitable clearance openings for threaded engagement with knurled clamping nuts 43, 44. Wedge-shaped leveling blocks 45, 46, formed of plastic or other suitable material are interposed under the nuts to accommodate the slope of the plate.

In use the carpet indicated at 60 in FIG. 2 is laid in place with the excess material at the edge bent upwardly along the wall surface as indicated at 61. In adjusting the cutting height, it is convenient to start the cut by making a short insertion with a knife at a corner of the room, with the trimmed edge thus formed being bent down flat to check the fit. With the clamping nuts 43, 44 backed off, the adjusting knob 33 is turned so that the tip 32, acting as a stop, crowds under the supporting plate, raising the blade of the tool to correspond to the level of the cut. Following this the nuts 43, 44 are turned tight, thereby clamping the supporting plate firmly against the bottoming stop so that the blade thereafter is held firmly against either upward or downward movement. The tool is simply pushed along the wall, with the working edge 22 serving to maintain the carpet firmly seated as it is acted upon, at a constant level, by the blade. A high degree of accuracy and consistency of cut is achieved which is particularly important with foam-backed carpeting since it cannot be stretched to fit as is the case with conventional carpeting. Whenever it is desired to change the height of the cut, the nuts 43, 44 can again be backed off, the adjusting knob may be turned in one direction or the other to achieve proper blade height, following which the nuts may again be turned tight. It is to be noted that while the adjusting knob is conveniently accessible under the arched handle there is nevertheless sufficient room for a comfortable grip. Tip 32 on the adjusting screw may be relatively rotatable.

While the supporting plate is hinged to the base plate at the bottom of the web 23 it will be apparent to one skilled in the art that the web 23 may be solidly secured to the base plate if desired and the hinge pin may be interposed between the portions 21, 23 without departing from the invention.

I claim as my invention:

1. In a carpet trimmer the combination comprising a base plate having a working edge and a handle remote from the edge, a blade supporting plate above the base plate, said supporting plate being of L-shaped cross section having a sloping portion which extends downwardly toward the working edge and having a vertical portion remote from such edge, a hinge on the base plate for hingedly mounting the lower edge of the vertical portion, an adjusting screw threadedly engaging the vertical portion and having an enlarged tip which is interposed between the sloping portion and the base plate to serve as a positioning stop, blade holder means mounted on the sloping portion for supporting a blade in a projecting carpet-cutting position angled with respect to the direction of cut, and releasable means secured to the base for applying clamping pressure to the supporting plate so that the tip of the adjusting screw is clamped securely between the plates thereby preventing either upward or downward movement of the supporting plate in response to reaction forces from the carpet as the carpet is cut by the blade.

2. In a carpet trimmer the combination comprising a base plate having a working edge terminating in corners, a blade supporting plate spaced above the base plate and having a working edge parallel to the edge of the base plate, a handle secured with respect to the base plate at the rear edge of the supporting plate, means including a hinge at the rear edge of the supporting plate for orienting the supporting plate in a position downwardly angled toward the working edge, blade holder means mounted on the supporting plate for supporting a blade in a projecting carpet cutting position, a positive stop interposed between the base plate and the supporting plate and in the path of relative swinging movement of the supporting plate about its hinge, means for adjusting the position of the stop relative to the hinge for determining the height of the supporting plate above the base plate thereby to determine the cutting height of the blade, and means secured to the base plate for applying clamping pressure to the supporting plate so that the adjustable stop is clamped securely between the supporting plate and the base plate to prevent dislodgement from its adjusted position.

3. In a carpet trimmer the combination comprising a base plate having a working edge, a blade supporting plate spaced above the base plate and extending toward the working edge, means for movably mounting the supporting plate in a downwardly angled position, a handle on the base plate, blade holder means mounted on the supporting plate for supporting a blade in a projecting carpet cutting position angled with respect to the direction of cut, a positive stop interposed between the base plate and the supporting plate and in the path of relative swinging movement of the supporting plate about its hinge, means for adjusting the position of the stop relative to the hinge for determining the effective height of the supporting plate above the base plate thereby to determine the cutting height of the blade, and means for holding the supporting plate against the stop thereby to hold the blade against vertical movement and to hold the stop in its adjusted position.

4. In a carpet trimmer the combination comprising a base plate having a working edge and a handle remote from the edge, a blade supporting plate of L-shaped cross section having a sloping portion and a relatively short vertical portion, the vertical portion being hinged along its lower edge to the base plate, blade holder means mounted on the sloping portion for supporting a blade in a projecting carpet cutting position angled with respect to the direction of cut, a stop member extending through the vertical portion of the supporting plate with the presented tip thereof interposed as a positive stop between the sloping portion of the plate and the base plate thereby to determine the angle of slope and consequently the cutting height of the blade, means for adjusting the stop member inwardly and outwardly, and releasable means for clamping the supporting plate downwardly in adjusted position.

5. In a carpet trimmer the combination comprising a base plate having a working edge and a handle remote from the edge, a blade supporting plate having a sloping portion and a relatively short supporting portion, the plate being hinged to vary the slope, blade holder means mounted on the sloping portion for supporting a blade in a projecting carpet cutting position angled with respect to the direction of the cut, a movable stop member projecting through the supporting portion and mounted for adjustable interposition as a positive stop between the sloping portion of the plate and the base plate thereby to determine the angle of slope and consequently the cutting height of the blade.

6. In a carpet trimmer the combination comprising a base plate having a working edge and a handle remote from the edge, a blade supporting plate superimposed on the base plate, means including a hinge at the rear edge of the supporting plate for supporting the same in a sloping position downwardly angled toward the working edge, a vertical web at the rear edge of the supporting plate, blade holder means mounted on the supporting plate for supporting a blade in a projecting carpet cutting position angled with respect to the direction of the cut, an adjusting screw threadedly mounted in the web and having a tip which serves as a bottoming stop for the supporting plate thereby to determine the cutting height of the blade, a knob at the outer end of the adjusting screw for turning the same, and releasable means for maintaining the supporting plate in secure bottoming engagement against the tip of the adjusting screw.

7. In a carpet trimmer the combination comprising a base plate having a working edge, a blade supporting plate of L-shaped cross section having a sloping portion and a short downwardly extending web portion at right angles thereto, a hinge at the lower edge of the web portion for hinging the same to the base plate, blade holder means mounted on the sloping portion of the supporting plate for supporting a blade in a projecting carpet cutting position angled with respect to the direction of cut, an adjusting screw having a knob at its outer end, said screw being located at the center of the supporting plate and threaded at right angles into the web portion so that the knob projects upwardly as well as rearwardly for easy access, said adjusting screw having a tip portion which moves inwardly and outwardly parallel to the underside of the sloping portion and closely adjacent thereto as the adjusting screw is turned thereby to vary the angle of slope and consequently the cutting height of the blade, means for maintaining the sloping portion pressed downwardly against the tip of the adjusting screw, and a handle of arched shape secured at its ends along the rear edge of the base plate and arching over the knob of the adjusting screw for easy access of the latter when adjustment becomes necessary.

References Cited

UNITED STATES PATENTS

| | | | |
|---|---|---|---|
| 2,065,761 | 12/1936 | Smith | 30—289X |
| 2,701,416 | 2/1955 | Snyder | 30—293 |
| 3,395,453 | 8/1968 | Prater | 30—293 |
| 3,482,310 | 12/1969 | Paterson | 30—293 |

GRANVILLE Y. CUSTER, JR., Primary Examiner

U.S. Cl. X.R.

30—321